(12) United States Patent
Kimura

(10) Patent No.: US 11,573,634 B2
(45) Date of Patent: Feb. 7, 2023

(54) DISPLAY METHOD, DISPLAY DEVICE, AND PROGRAM

(71) Applicant: SEIKO EPSON CORPORATION, Tokyo (JP)

(72) Inventor: Fusashi Kimura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/583,170

(22) Filed: Jan. 24, 2022

(65) Prior Publication Data

US 2022/0236798 A1 Jul. 28, 2022

(30) Foreign Application Priority Data

Jan. 26, 2021 (JP) .............................. JP2021-010024

(51) Int. Cl.
*G06F 3/01* (2006.01)
*G02B 27/01* (2006.01)

(52) U.S. Cl.
CPC ......... *G06F 3/013* (2013.01); *G02B 27/0172* (2013.01); *G02B 27/0179* (2013.01); *G02B 2027/0187* (2013.01)

(58) Field of Classification Search
None
See application file for complete search history.

(56) References Cited

U.S. PATENT DOCUMENTS

| 2011/0006978 A1* | 1/2011 | Yuan | G06F 3/0481 351/209 |
| 2014/0225920 A1* | 8/2014 | Murata | G02B 27/017 345/633 |
| 2018/0249150 A1* | 8/2018 | Takeda | H04N 13/332 |
| 2019/0356903 A1* | 11/2019 | Uhm | H04N 13/239 |

FOREIGN PATENT DOCUMENTS

JP 2018141874 9/2018

* cited by examiner

*Primary Examiner* — Chad M Dicke
(74) *Attorney, Agent, or Firm* — JCIPRNET

(57) ABSTRACT

A display method for displaying an image by an HMD mounted on a head of a user includes: an identifying step for identifying a direction in which the user gazes; and an adjusting step for adjusting a display aspect of a display image so that a gaze region that the user gazes at in the display image displayed by the HMD approaches a predetermined position corresponding to a front of the user.

9 Claims, 10 Drawing Sheets

DISPLAY METHOD, DISPLAY DEVICE, AND PROGRAM

The present application is based on, and claims priority from JP Application Serial Number 2021-010024, filed Jan. 26, 2021, the disclosure of which is hereby incorporated by reference herein in its entirety.

BACKGROUND

1. Technical Field

The present disclosure relates to a display method, a display device, and a program.

2. Related Art

Traditionally, among display devices mounted on a head of a user, those that perform an operation corresponding to change in the line of sight of the user are known. JP-A-2018-141874 discloses a display device that changes a display aspect of an image when the line-of-sight direction of the user changes beyond a predetermined angle. For example, a crisscross mark is displayed at a position corresponding to the line-of-sight direction of the user.

In the display devices mounted on the user's head, the relative positional relationship between the display image and the visual field of the user does not change even when the posture of the user changes. For this reason, when an image that the user desires to view is not at the center of the visual field, the user needs to continue to view a position off the center of the visual field, and there is a demand for improved convenience.

SUMMARY

An aspect for solving the above-described problems is a display method for displaying an image on a display device mounted on a head of a user, the display method including: an identifying step for identifying a gaze region of the image in which the user gazes; and an adjusting step for adjusting a position of the gaze region displayed on the display device to approach a predetermined position corresponding to a front of the user.

Another aspect for solving the above-described problems is a display device mounted on a head of a user, the display device including: a display unit that displays an image; a gaze direction identification unit that identifies a gaze region of the image in which the user gazes; and a display control unit that adjusts a position of the gaze region displayed on the display unit to approach a predetermined position corresponding to a front of the user.

Another aspect for solving the above-described problems is a non-transitory computer-readable storage medium comprising a computer executable program configured to display an image by a display device mounted on a head of a user, the computer executable program being configured to: identify a gaze region of the image in which the user gazes; and adjust a position of the gaze region displayed on the display device to approach a predetermined position corresponding to a front of the user.

DESCRIPTION OF EXEMPLARY EMBODIMENTS

1. Configuration of Display System

Figure 1:
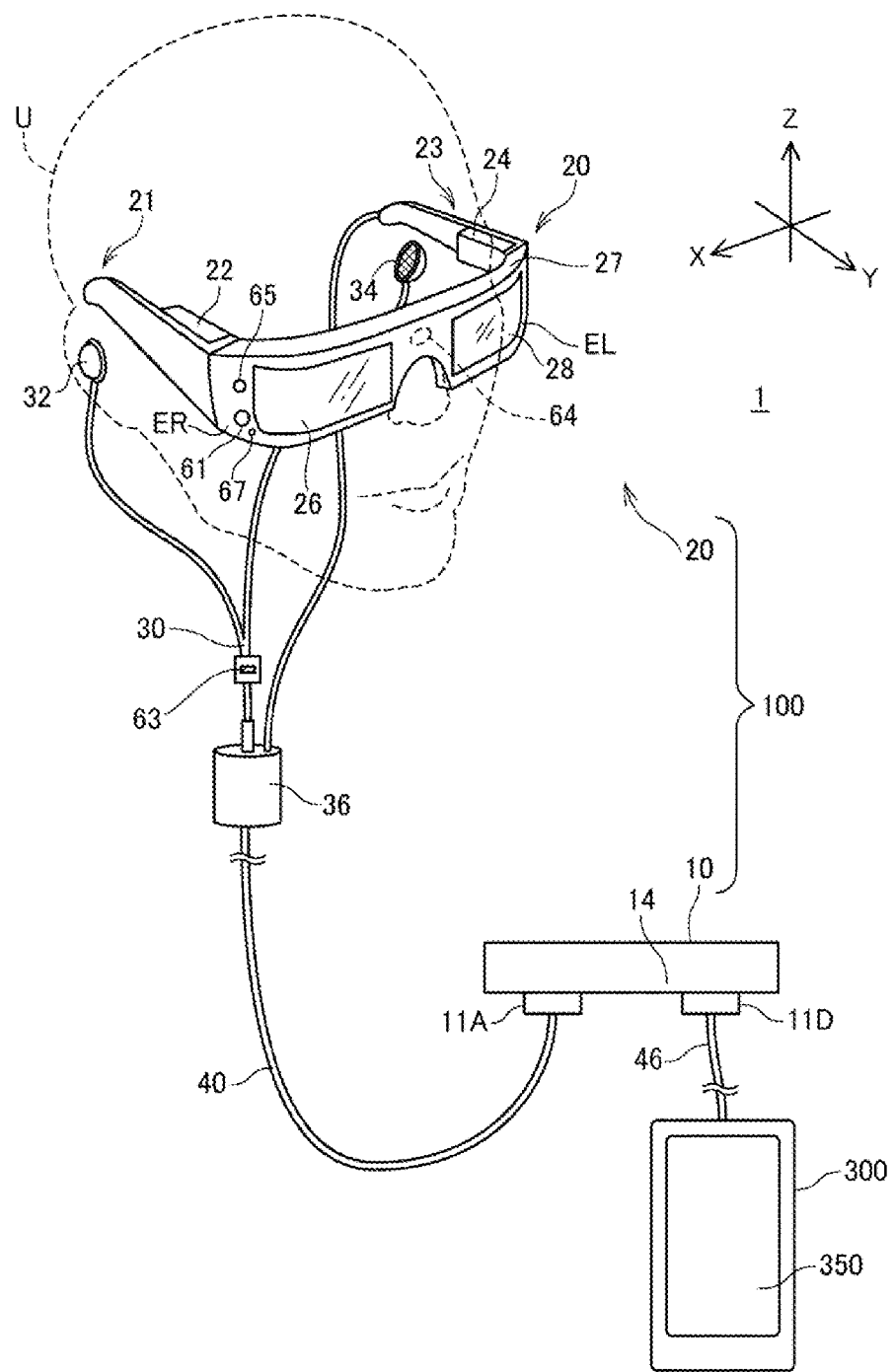
FIG. 1 is a view illustrating a general configuration of a display system.

Hereinafter, embodiments to which the present disclosure is applied will be described with reference to the accompanying drawings. FIG. 1 is a view illustrating a general configuration of a display system 1.

The display system 1 includes an HMD 100 and a control device 300. The HMD 100 is a head-mounted display device that includes an image display unit 20 mounted on the user U's head and that allows the user U to visually recognize images or video. The HMD 100 is an example of a display device according to the present disclosure. HMD is an abbreviation for head-mounted display.

The HMD 100 includes a coupling device 10 coupled to the image display unit 20. The coupling device 10 functions as an interface for coupling the HMD 100 to a device different from the HMD 100. In the display system 1, the control device 300 is coupled to the coupling device 10.

The control device 300 is an example of an external device that outputs an image signal to the HMD 100. Image signals output by the control device 300 include, for example, digital images compliant with high definition multimedia interface (HDMI) or mobile high-definition link (MHL). However, image signals may be data in other formats, and may be analog image signals. A sound signal may be included in image signals output by the control device 300. HDMI and MHL are trade names.

The control device 300 includes a display screen that displays characters or images, and a touch panel 350 that functions as an operation unit for detecting touch operations or pressing operations. The control device 300 is a portable-sized terminal device and a smartphone can be used therefor, for example. The touch panel 350 includes a touch sensor and a display screen overlaid one on the other. The touch panel 350 functions as a display that displays images and the like and as an operation device for detecting operations by the user U. The control device 300 may be a desktop personal computer, a laptop personal computer, a tablet personal computer, and the like.

The coupling device 10 includes a connector 11A and a connector 11D. The image display unit 20 is coupled to the connector 11A via a coupling cable 40, while the control device 300 is coupled to the connector 11D via a USB cable 46. The HMD 100 and the control device 300 are coupled so as to be capable of transmitting and receiving data to and from each other. For example, the control device 300 can output an image signal to the HMD 100 as described above. In addition, for example, the HMD 100 can transmit detection data for various sensors included in the image display unit 20 to the control device 300. In addition, power may also be suppliable from the control device 300 to the image display unit 20 via the USB cable 46.

The configuration in which the coupling device 10 and the control device 300 are coupled using the USB cable 46 is merely an example. Specific forms of coupling between the coupling device 10 and the control device 300 are not limited. For example, other kinds of cables may be used for wired connection, and the coupling device 10 and the control device 300 may be wirelessly connected.

The image display unit 20 includes a main body including a right holding part 21, a left holding part 23, and a front frame 27. The main body further includes a right display unit 22, a left display unit 24, a right light-guiding plate 26, and a left light-guiding plate 28.

The right holding part 21 and the left holding part 23 extend rearward from corresponding ends of the front frame 27, and hold the image display unit 20 to the user U's head. The right holding part 21 is joined to an end ER positioned on the right side of the user U in the front frame 27, while the left holding part 23 is joined to an end EL positioned on the left side of the user U.

The right light-guiding plate 26 and the left light-guiding plate 28 are provided at the front frame 27. The right light-guiding plate 26 is positioned in front of the right eye of the user U in a mounted state of the image display unit 20, and allows the right eye to visually recognize an image. The left light-guiding plate 28 is positioned in front of the left eye of the user U in a mounted state of the image display unit 20, and allows the left eye to visually recognize an image. The right light-guiding plate 26 and the left light-guiding plate 28 are optical parts formed of an optically transparent resin and the like. The right light-guiding plate 26 and the left light-guiding plate 28 guide imaging light output by the right display unit 22 and the left display unit 24 to the eyes of the user U. The right light-guiding plate 26 and the left light-guiding plate 28 are, for example, prisms.

The front frame 27 has a shape formed by joining an end of the right light-guiding plate 26 and an end of the left light-guiding plate 28 to each other. This joining position corresponds to a position between eyebrows of the user U in a mounted state in which the user wears the image display unit 20. The front frame 27 may include a nose pad abutting the nose of the user U in a mounted state of the image display unit 20. A belt may be joined to the right holding part 21 and the left holding part 23 to hold the image display unit 20 to the user U's head by the belt.

The right display unit 22 and the left display unit 24 are each a module in which an optical unit and a peripheral circuit are unitized. The right display unit 22 displays an image by the right light-guiding plate 26, while the left display unit 24 displays an image by the left light-guiding plate 28. The right display unit 22 is provided at the right holding part 21, while the left display unit 24 is provided at the left holding part 23.

Imaging light guided by the right light-guiding plate 26 and outside light transmitting through the right light-guiding plate 26 are incident on the right eye of the user U. Similarly, the imaging light guided by the left light-guiding plate 28 and outside light transmitting through the left light-guiding plate 28 are incident on the left eye. The imaging light from the right light-guiding plate 26 and the left light-guiding plate 28 and outside light transmitting through the right light-guiding plate 26 and the left light-guiding plate 28 are incident on the eyes of the user U. This allows the user U to visually recognize the image displayed by the image display unit 20 and outside scene transmitting through the right light-guiding plate 26 and the left light-guiding plate 28 in a superimposed manner.

An illuminance sensor 65 is arranged at the front frame 27. The illuminance sensor 65 is a sensor that receives outside light coming from the front of the user U wearing the image display unit 20.

An outer camera 61 is provided at the front frame 27 and positioned so as not to block outside light transmitting through the right light-guiding plate 26 and the left light-guiding plate 28. The outer camera 61 is a digital camera including a photographing element such as a charge-coupled device (CCD) and a complementary metal-oxide-semiconductor (CMOS), a photographing lens, and the like. The outer camera 61 may be a monocular camera and may be a stereo camera. The angle of view of the outer camera 61 includes at least a part of the range of outside scene that the user U wearing the image display unit 20 visually recognizes through the right light-guiding plate 26 and the left light-guiding plate 28. A light emitting diode (LED) indicator 67 that turns on during operation of the outer camera 61 is arranged at the front frame 27. A distance sensor 64 that detects a distance to a measurement target object positioned in a preset measurement direction is provided at the front frame 27. The distance sensor 64 is, for example, a light reflective distance sensor that uses an LED, a laser diode, and the like, an infrared depth sensor, an ultrasonic distance sensor, or a laser range scanner.

The right display unit 22 and the left display unit 24 are each coupled to the coupling device 10 by the coupling cable 40. The coupling cable 40 includes an audio connector 36. A headset 30 including a right earphone 32 and a left earphone 34 constituting a stereo headphone, and a microphone 63 is coupled to the audio connector 36. The right earphone 32 and the left earphone 34 output sound based on a sound signal output from the coupling device 10. The microphone 63 collects sound and outputs a sound signal to the coupling device 10.

Figure 2:
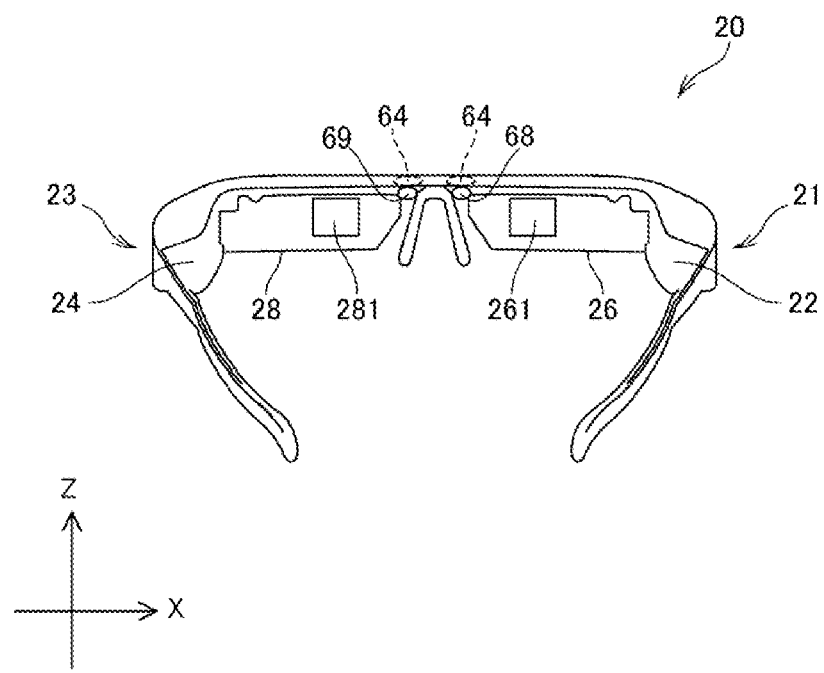
FIG. 2 is a perspective view of an image display unit.

FIG. 2 is a perspective view of the image display unit 20. Specifically, FIG. 2 is a view of the image display unit 20 as seen from the side of the left eye LE and the right eye RE of the user U.

The right display unit 22 and the left display unit 24 are configured to be laterally symmetrical, for example.

Inner cameras 68 and 69 are arranged between the right display unit 22 and the left display unit 24. The inner cameras 68 and 69 are cameras arranged between the right eye RE and the left eye LE of the user U. The inner camera 68 photographs the right eye RE, while the inner camera 69 photographs the left eye LE. Based on a photographed image of the inner camera 68, the HMD 100 detects the position of the pupil of the right eye RE, thereby detecting the line-of-sight direction of the right eye RE. Similarly, based on a photographed image of the inner camera 69, the HMD 100 detects the position of the pupil of the left eye LE, thereby detecting the line-of-sight direction of the left eye LE. The inner cameras 68 and 69 may include a light source that emits light to facilitate detection of the positions of the pupils.

The right display unit 22 and the left display unit 24 each include a light source and a light modulation device that modulates light emitted by the light source and generates imaging light. In the present embodiment, as will be described later, the right display unit 22 includes an organic light-emitting diode (OLED) unit 221, while the left display unit 24 includes an OLED unit 241, with imaging light being emitted by the OLED unit 221 and the OLED unit 241.

The right display unit 22 includes the right light-guiding plate 26 positioned in front of the right eye RE. The right light-guiding plate 26 guides the imaging light emitted by the OLED unit 221 to a half mirror 261 positioned in front of the right eye RE. The half mirror 261 reflects the imaging light toward the right eye RE, thereby allowing the right eye RE of the user U to visually recognize an image. The left display unit 24 includes the left light-guiding plate 28 positioned in front of the left eye LE. The left light-guiding plate 28 guides the imaging light emitted by the OLED unit 241 to a half mirror 281 positioned in front of the left eye LE. The half mirror 281 reflects the imaging light toward the left eye LE, thereby allowing the left eye LE to visually recognize an image.

The half mirrors 261 and 281 are each an image extracting unit that reflects imaging light output by the right display unit 22 and the left display unit 24, respectively, and extracts an image. The half mirrors 261 and 281 are each constitutive of a display unit.

The HMD 100 functions as a transmissive display device. In other words, the imaging light reflected by the half mirror 261 and outside light transmitting through the right light-guiding plate 26 are incident on the right eye RE of the user U. The imaging light reflected by the half mirror 281 and outside light transmitting through the left light-guiding plate 28 are incident on the left eye LE. The HMD 100 causes the imaging light of an internally processed image and outside light to be incident on the eyes of the user U in a superimposed manner. For this reason, the user U can see outside scene through the right light-guiding plate 26 and the left light-guiding plate 28, and visually recognize an image and outside scene in a superimposed manner.

In FIG. 1 and the drawings described later, the direction in which the right light-guiding plate 26 and the left light-guiding plate 28 are aligned in the image display unit 20 is referred to as the X direction. The X direction corresponds to the direction in which the right eye RE and the left eye LE of the user U are aligned. In addition, the vertical direction obtained when the user U's head is upright is referred to as the Z direction. The direction perpendicular to the X direction and the Z direction is referred to as the Y direction. The X direction, the Y direction, and the Z direction are directions based on the user U's head on which the image display unit 20 is mounted. The Z direction corresponds to the front direction of the user U.

2. Control System of HMD

Figure 3:
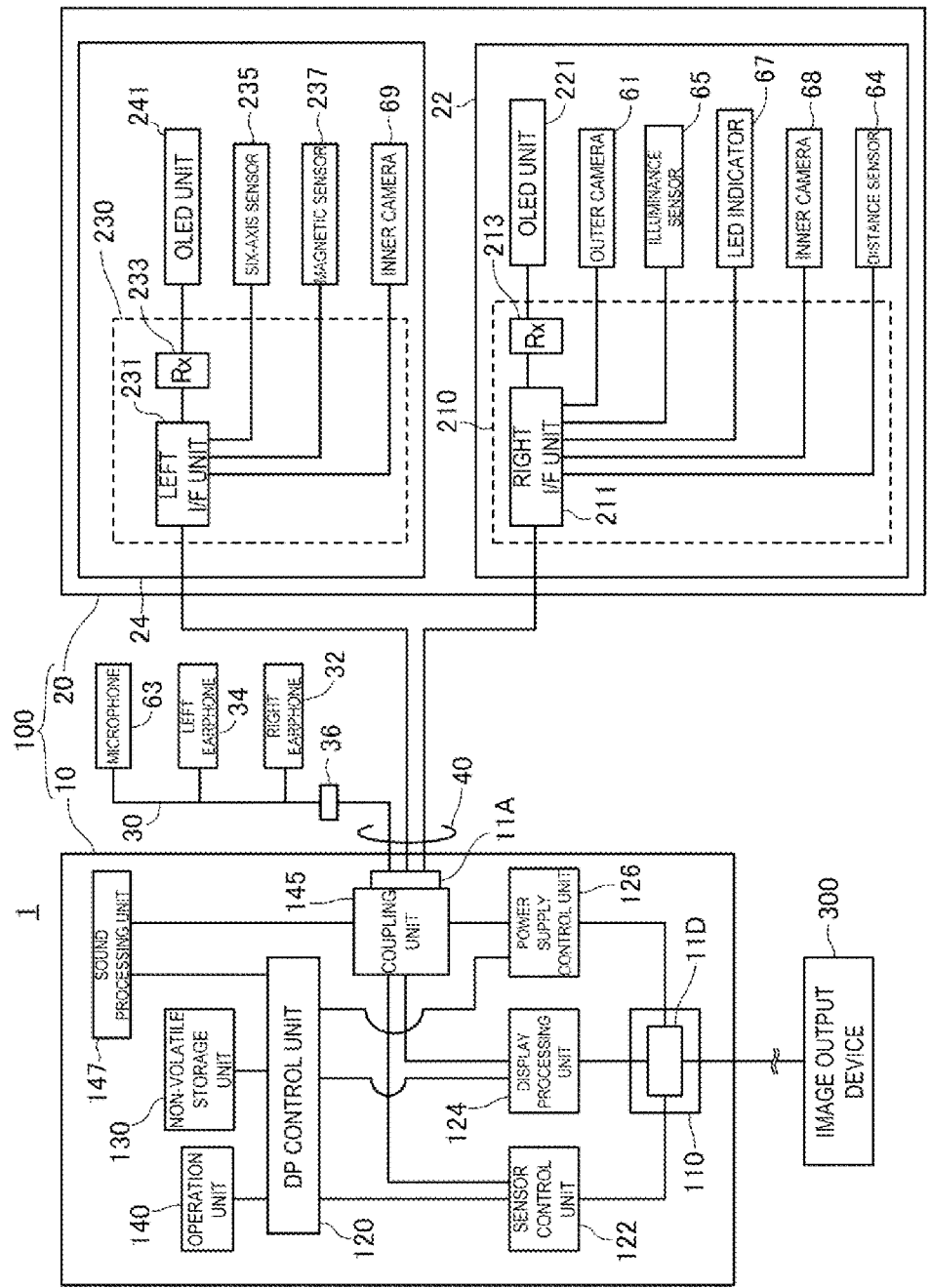
FIG. 3 is a block diagram of a display system.

FIG. 3 is a block diagram of the display system 1. In particular, FIG. 3 illustrates the configuration of the HMD 100 in detail.

The right display unit 22 of the image display unit 20 includes a right display unit substrate 210. At the right display unit substrate 210, a right I/F unit 211 coupled to the coupling cable 40, and a reception unit 213 that receives data input from the coupling device 10 via the right I/F unit 211 are mounted. The right I/F unit 211 couples the reception unit 213, the outer camera 61, the distance sensor 64, the illuminance sensor 65, the LED indicator 67, and the inner camera 68 to the coupling device 10. The reception unit 213 couples the OLED unit 221 to the coupling device 10.

The left display unit 24 includes a left display unit substrate 230. At the left display unit substrate 230, a left I/F unit 231 coupled to the coupling cable 40, and a reception unit 233 that receives data input from the coupling device 10 via the left I/F unit 231 are mounted.

The left I/F unit 231 couples the reception unit 233, the inner camera 69, a six-axis sensor 235, and a magnetic sensor 237 to the coupling device 10. The reception unit 233 couples the OLED unit 241 to the coupling device 10.

In the description and drawings of the present embodiment, I/F is an abbreviation for interface. In the drawings, the reception unit 213 and the reception unit 233 will be referred to as Rx 213 and Rx 233, respectively.

The outer camera 61 executes photographing in accordance with a signal input via the right I/F unit 211, and outputs photographed image data to the right I/F unit 211. The illuminance sensor 65 receives outside light and outputs a detection value corresponding to an amount of received light or an intensity of received light. The LED indicator 67 is turned on in accordance with a control signal or a driving current input via the right I/F unit 211.

The distance sensor 64 outputs a signal indicating a detection result obtained through distance detection to the coupling device 10 via the right I/F unit 211.

The inner camera 68 executes photographing in accordance with a signal input via the right I/F unit 211, and outputs photographed image data to the right I/F unit 211. The inner camera 69 executes photographing in accordance with a signal input via the left I/F unit 231, and outputs photographed image data to the left I/F unit 231.

The reception unit 213 receives video data for display use transferred from the coupling device 10 via the right I/F unit 211, and outputs the same to the OLED unit 221. The OLED unit 221 displays video based on the video data transferred by the coupling device 10.

The reception unit 233 receives video data for display use transferred from the coupling device 10 via the left I/F unit 231, and outputs the same to the OLED unit 241. The OLED units 221 and 241 display video based on the video data transferred by the coupling device 10.

The six-axis sensor 235 is a motion sensor including a three-axis acceleration sensor and a three-axis gyro sensor. The magnetic sensor 237 is, for example, a three-axis geomagnetic sensor. The six-axis sensor 235 and the magnetic sensor 237 may be an IMU in which each of the sensors described above is modularized, or may be a module in which the six-axis sensor 235 and the magnetic sensor 237 are integrated. IMU is an abbreviation for inertial measurement unit. The six-axis sensor 235 and the magnetic sensor 237 each output a detection value to the coupling device 10.

Each component of the image display unit 20 operates with power supplied from the coupling device 10 via the coupling cable 40.

The coupling device 10 includes an I/F unit 110, a DP control unit 120, a sensor control unit 122, a display processing unit 124, a power supply control unit 126, a non-volatile storage unit 130, an operation unit 140, a coupling unit 145, and a sound processing unit 147.

The I/F unit 110 includes a connector 11D, and an interface circuit that executes communication protocols compliant with various communication standards by the connector 11D. The I/F unit 110 is, for example, an interface substrate at which the connector 11D and the interface circuit are mounted. The I/F unit 110 may include an interface for a memory card and the like to which an external storage device or storage medium can be coupled. The I/F unit 110 may be constituted by a radio communication interface.

As will be described later with reference to FIG. 4, the DP control unit 120 includes a processor 160 such as a central processing unit (CPU) and a microcomputer, and a memory 170. The DP control unit 120 executes a program by the processor 160 and controls each component of the coupling device 10. The memory 170 stores a control program 171 executed by the processor 160 and other various programs or data. In addition, the memory 170 may include a volatile storage area, and may form a work area for temporarily storing a program or data.

The non-volatile storage unit 130, the operation unit 140, the coupling unit 145, and the sound processing unit 147 are coupled to the DP control unit 120. The non-volatile storage unit 130 is a ROM that stores a program or data in a non-volatile manner. ROM is an abbreviation for read-only memory.

The sensor control unit 122 causes each of the sensors included in the image display unit 20 to operate. Here, each of the sensors means each of the outer camera 61, the distance sensor 64, the illuminance sensor 65, the six-axis sensor 235, and the magnetic sensor 237. At least one of the outer camera 61, the illuminance sensor 65, the six-axis sensor 235, and the magnetic sensor 237 is included in the sensors. The sensor control unit 122 sets a sampling period for and initializes each sensor in accordance with control of the DP control unit 120. The sensor control unit 122 executes energization of each sensor, transmission of control data, acquisition of a detection value, and the like according to the sampling period of each sensor.

The sensor control unit 122 outputs detection data indicating a detection value or a detection result of each sensor to the I/F unit 110 at a preset timing. In addition, similar to detection values or detection results of other sensors, the sensor control unit 122 may output photographed image data of the outer camera 61 to the I/F unit 110. The sensor control unit 122 may output photographed image data of the inner cameras 68 and 69 to the I/F unit 110.

Through the operation of the sensor control unit 122, the control device 300 coupled to the I/F unit 110 can acquire a detection value of each sensor of the HMD 100 or photographed image data of the outer camera 61.

The display processing unit 124 executes various processing for causing the image display unit 20 to display an image based on an image signal input to the I/F unit 110. For example, the display processing unit 124 executes various processing such as frame extraction, resolution conversion, scaling, intermediate frame generation, and frame rate conversion. The display processing unit 124 outputs video data corresponding to the OLED units 221 and 241 to the coupling unit 145. The video data input to the coupling unit 145 is transferred from the connector 11A to the right I/F unit 211 and the left I/F unit 231.

The sensor control unit 122 and/or the display processing unit 124 may be realized by cooperation between software and hardware, with a processor executing a program. In other words, the sensor control unit 122 and the display processing unit 124 are constituted by a processor, and executing a program causes the operations described above to be executed. In this example, the sensor control unit 122 and the display processing unit 124 may be realized by a processor that constitutes the DP control unit 120 executing a program. To put it differently, by executing a program, the processor may function as the DP control unit 120, the sensor control unit 122, and the display processing unit 124. Here, the processor can be paraphrased as a computer. The sensor control unit 122 and the display processing unit 124 may include a work memory for performing data processing, and may perform processing by utilizing the memory 170 of the DP control unit 120.

The display processing unit 124 and the sensor control unit 122 may be constituted by programmed hardware such as a DSP and a FPGA. The sensor control unit 122 and the display processing unit 124 may be integrated and constituted by an SoC-FPGA. DSP is an abbreviation for digital signal processor, FPGA is an abbreviation for field programmable gate array, and SoC is an abbreviation for system-on-a-chip.

The power supply control unit 126 includes a power supply circuit coupled to the connector 11D. The power supply control unit 126 supplies power to each component of the coupling device 10 and to the image display unit 20 based on power supplied from the connector 11D.

The operation unit 140 detects an operation on a switch and the like included in the coupling device 10 and outputs data indicating an operation content to the DP control unit 120.

The sound processing unit 147 generates a sound signal in accordance with sound data input from the DP control unit 120, and outputs the same to the coupling unit 145. This sound signal is output from the coupling unit 145 to the right earphone 32 and the left earphone 34 via the audio connector 36. The sound processing unit 147 generates sound data of sound collected by the microphone 63, and outputs the same to the DP control unit 120. Similar to the detection data of the sensors included in the image display unit 20, the sound data output by the sound processing unit 147 may be processed by the sensor control unit 122.

3. Configuration of Control Unit

Figure 4:
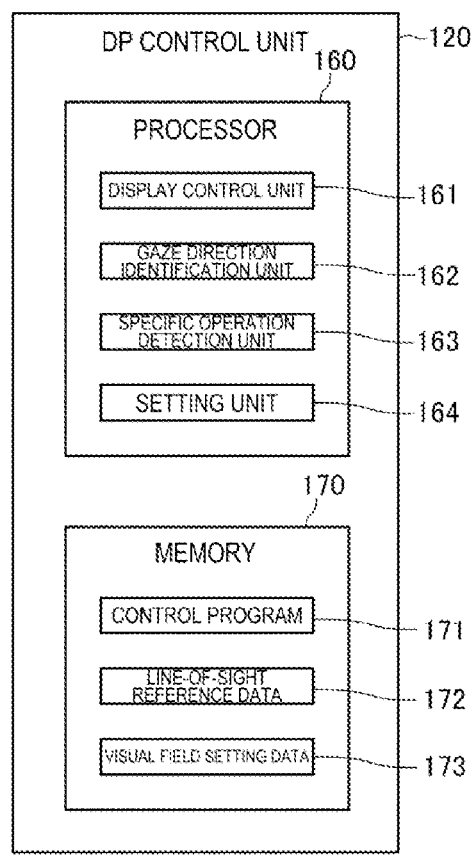
FIG. 4 is a block diagram of a DP control unit.

FIG. 4 is a block diagram of the DP control unit 120.

The DP control unit 120 includes the processor 160 and the memory 170.

As function units included in the processor 160, FIG. 4 illustrates a display control unit 161, a gaze direction identification unit 162, a specific operation detection unit 163, and a setting unit 164. These function units are realized, for example, by cooperation between software and hardware, with the processor 160 executing a program.

The memory 170 stores the control program 171, line-of-sight reference data 172, and visual field setting data 173. The line-of-sight reference data 172 is the data that serves as a reference in the processing for determining the line-of-sight direction of the user U. The visual field setting data 173 is the data that serves as a reference in the processing for changing the display aspect of an image according to the line-of-sight direction of the user U.

The display control unit 161 controls the display processing unit 124 to change the display aspects of images displayed by the OLED units 221 and 241.

The gaze direction identification unit 162 identifies a gaze direction and a gaze region of the user U wearing the image display unit 20. A gaze direction of the user U is a direction in which the line of sight of the user U is directed. A gaze region is a region positioned in the gaze direction of the user U in an image displayed by the image display unit 20.

The specific operation detection unit 163 detects a specific operation performed by the user U wearing the image display unit 20. Specific operations are preset. For example, when it is detected that an operation of closing both eyes by the user U or an operation of staring in a specific direction by the user U is performed, the specific operation detection unit 163 determines that a specific operation is performed. In addition, the specific operation may be an operation performed by the user U on the operation unit 140.

4. Overview of Operation of Display System

Figure 5:
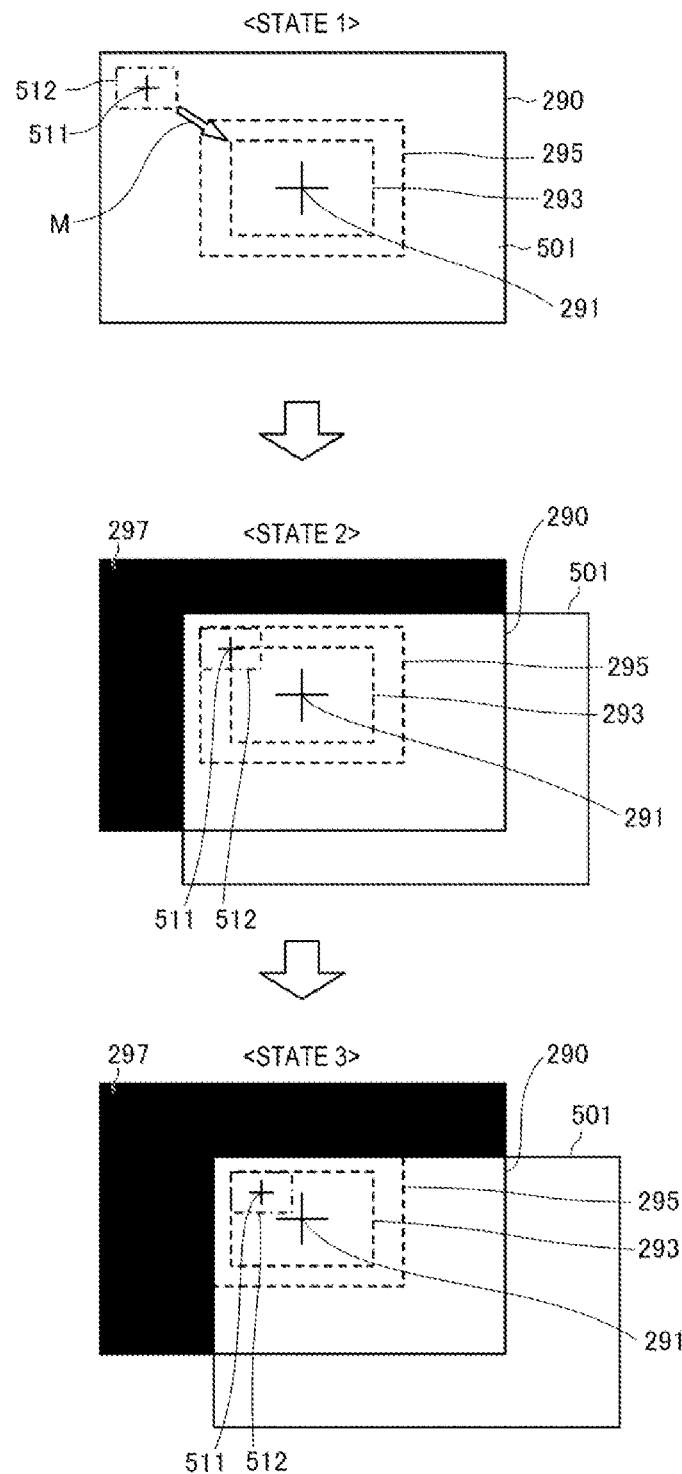
FIG. 5 is a schematic view illustrating a process of changing a display aspect of a display image.

FIG. 5 is a schematic view illustrating a process of changing a display aspect of a display image in the display system 1.

When the line of sight of the user U wearing the image display unit 20 is outside a preset range, the display system 1 changes the display aspect of a display image displayed by the image display unit 20. Specifically, the region that the user U gazes at in a display image of the image display unit 20 is moved to a position that is easy for the user U to visually recognize.

FIG. 5 illustrates a process of changing a display image of the image display unit 20 loosely divided into three stages.

In FIG. 5, a gaze position 511 that the user U gazes at in a display image 501 is indicated by a cross marker, and a gaze region 512 including the gaze position 511 is indicated by a virtual line. The gaze position 511 and the gaze region 512 are actually not displayed. The gaze region 512 is also called an AOI. AOI is an abbreviation for area of interest.

A display region 290 is a region in which the image display unit 20 displays an image. The image display unit 20 emits imaging light from the half mirrors 261 and 281 to the right eye RE and the left eye LE of the user U, thereby allowing the user U to visually recognize a virtual image. The user U perceives as if the display region 290 exists, in the space in front of the user U, at a position separated from the user U by a predetermined distance. That is, there is no component corresponding to an image display region in the image display unit 20. The display region 290 indicates the entire image that the image display unit 20 allows the user U to visually recognize.

A center of visual field 291 is a position in the display region 290 that overlaps the line of sight when the line-of-sight direction of the user U faces the front. The line-of-sight direction of the user U when the user U faces the front means the line-of-sight direction of the user U when the user U has a feeling of facing the front. To put it differently, it is the line-of-sight direction obtained when the user U has a feeling of unconsciously facing the front, or the line-of-sight direction obtained when the user U naturally looks forward. The center of visual field 291 corresponds to a predetermined position corresponding to the front of the user U. The center of visual field 291 may be called a reference position.

A first range 293 is a predetermined range centered on the center of visual field 291. Although FIG. 5 illustrates an example in which the first range 293 is rectangular, the first range 293 may be circular or elliptical. The first range 293 indicates a range that the user U can visually recognize without a significant burden imposed on the vision of the user U when the line of sight of the user U is directed to the center of visual field 291.

Generally, the visual field angle of humans is about 200 degrees in the horizontal direction and about 125 degrees in the vertical direction. Out of these angles, an effective visual field advantageous for information acceptance performance is approximately 30 degrees in the horizontal direction and approximately 20 degrees in the vertical direction. The range of central vision in which human vision can demonstrate high cognitive capability is 2° in the vertical direction and the horizontal direction with the center of visual field 291 as the center. In addition, when the line of sight is directed to the center of visual field 291, the character recognition limit within which the user U can recognize characters corresponds to a range of 10° to 20° or less with the center of visual field 291 as the center. Similarly, it is said that the symbol recognition limit within which the user U can recognize images, figures, and the like is 10° to 60° or less, while the color discrimination limit within which the user U can discriminate colors is 60° to 120° or less. In addition, the range of natural eyeball movement of humans is approximately 30°, namely, approximately ±15° in the vertical direction and the horizontal direction from the center of the visual field.

Thus, in the present embodiment, the first range 293 is set as a range that the user U is considered to be able to comfortably visually recognize. The first range 293 is a range of 20° or less in the vertical direction and the horizontal direction with the center of visual field 291 as the center. The first range 293 is within the range of the character recognition limit of humans. That is, the user U can recognize characters and images positioned in the first range 293. Furthermore, in the present embodiment, a second range 295 larger than the first range 293 is set. The second range 295 is a range larger than the first range 293, and is defined in consideration of a limit obtained by combining the character recognition limit of humans and the natural eyeball movement of humans. The user U can move the right eye RE and the left eye LE to recognize characters or images positioned in the second range 295.

The first range 293 and the second range 295 are defined with the center of visual field 291 as a reference. Data indicating the positional relationship between a display position of the image display unit 20 and the center of visual field 291, the first range 293, and the second range 295 is stored in the memory 170 as the visual field setting data 173.

The center of visual field 291, the first range 293, and the second range 295 are set by the setting unit 164 to be described later. When the setting unit 164 sets the center of visual field 291, the first range 293 and the second range 295 are determined from the center of visual field 291. In addition, the setting unit 164 may set the first range 293 and the second range 295 but omit setting the center of visual field 291.

In a state before the display system 1 changes the display aspect of the display image 501, the display image 501 is displayed on the entire display region 290, as illustrated in FIG. 5 as state 1. Here, the display system 1 detects that the line of sight of the user U is directed to the gaze position 511 and identifies the gaze region 512. The display system 1 moves a part or all of the display image 501 such that the gaze region 512 is included within the first range 293.

The display system 1 may move the entire display image 501 relative to the display region 290, and thereby change the display aspect such that the gaze region 512 enters the first range 293. The display system 1 may move display objects such as characters, images, and the like displayed in the gaze region 512.

Hereinafter, an example of moving the entire display image 501 relative to the display region 290 will be described.

The state 1 in FIG. 5 is a state in which the gaze position 511 and the gaze region 512 are identified. Here, a movement direction M in which the gaze region 512 is to be moved is determined, and the movement of the display image 501 is started. State 2 is a state in which the gaze region 512 reaches the second range 295. In FIG. 5, a state in which the entire gaze region 512 enters the second range 295 is referred to as reaching the second range 295. That is, whether the entire gaze region 512 is positioned inside the second range 295 is used as a determination criterion for whether the gaze region 512 is outside the second range 295. This is only an example. For example, a state in which at least a part of the gaze region 512 overlaps with the outer edge of the second range 295 may be used as a determination criterion. In addition, the outer edge of the gaze region 512 overlapping with the outer edge of the second range 295, or the gaze position 511 overlapping with the outer edge of the second range 295 may be used as a determination criterion.

Similarly, the determination criterion for whether the gaze region 512 is outside the first range 293 can be suitably set. That is, whether the gaze region 512 is outside the first range 293 may be determined based on whether the entire gaze region 512 is positioned inside the first range 293. In addition, for example, a state in which at least a part of the gaze region 512 overlaps with the outer edge of the first range 293 may be used as a determination criterion. In addition, the outer edge of the gaze region 512 overlapping with the outer edge of the first range 293, or the gaze position 511 overlapping with the outer edge of the first range 293 may be used as a determination criterion.

The display system 1 further continues the movement of the display image 501 from the state 2. State 3 is a state in which the gaze region 512 reaches the first range 293. Here, the display system 1 ends the movement of the display image 501.

The display system 1 changes the movement velocity at which the display image 501 is moved in the movement direction M in a process of advancing from the state 1 to the state 3. For example, the display image 501 is moved at a first velocity from the state 1 to the state 2, while the display image 501 is moved at a second velocity from the state 2 to the state 3. The second velocity is slower than the first velocity. That is, after the gaze region 512 reaches the second range 295, the display image 501 moves at a slower velocity than before. This allows the movement velocity of the display image 501 to be slowed after a state is reached in which it becomes easy for the user U to visually recognize the gaze region 512, thereby reducing uncomfortable feeling of the user U caused by the movement of the display image 501. In addition, moving the display image 501 initially at the higher first velocity can realize quick movement.

Hereinafter, the operation of the display system 1 will be described in detail with reference to the accompanying drawings.

In the present embodiment, an example is described in which the HMD 100 executes various operations including an operation of detecting the line-of-sight direction of the user U and an operation of changing the display aspect of the display image 501. Some of the operations of the HMD 100 to be described below can also be realized by being executed by the control device 300.

5. Operation of HMD

Figure 6:
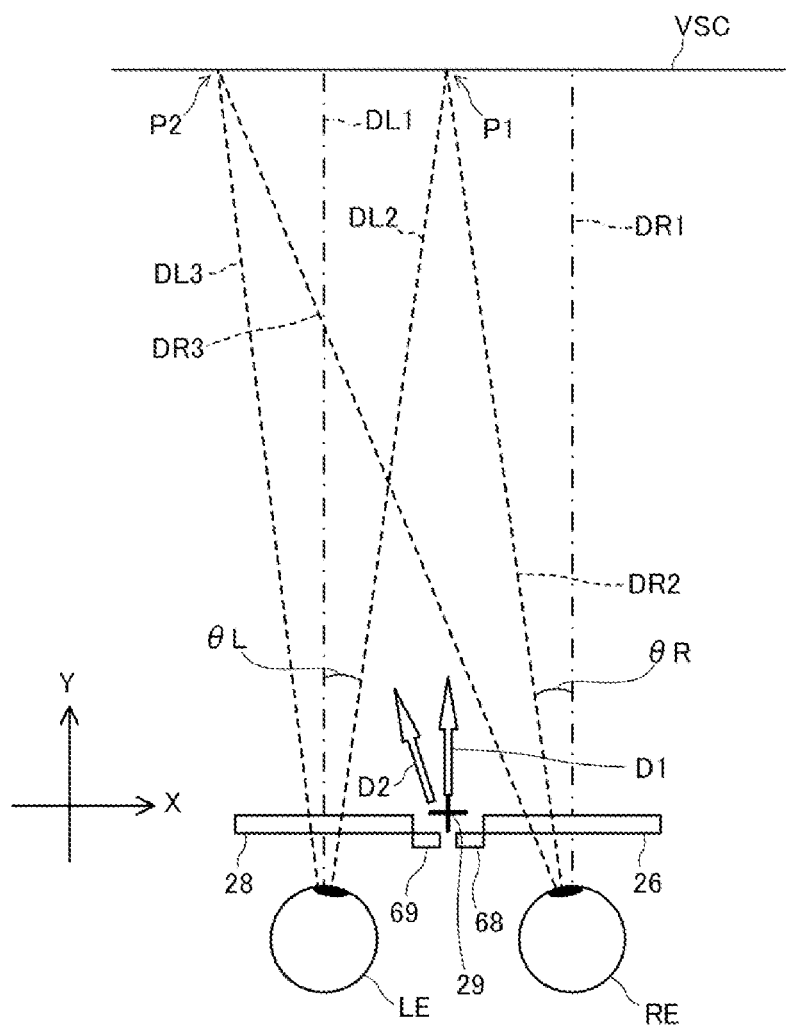
FIG. 6 is an explanatory view of processing for identifying a line-of-sight direction.

FIG. 6 is an explanatory view of the processing for identifying the line-of-sight direction. FIG. 6 illustrates the positional relationship between the image display unit 20 and the right eye RE and the left eye LE of the user U in a plan view. A virtual screen VSC in FIG. 6 is a virtual plane positioned in front of the user U wearing the image display unit 20. The user U recognizes an image displayed by the image display unit 20 as an image projected on the virtual screen VSC. Therefore, when the user U gazes at a display image of the image display unit 20, the line of sight of the user U points toward the virtual screen VSC.

Line-of-sight directions DR1, DR2, DR3, DL1, DL2, and DL3, gaze points P1 and P2, and gaze directions D1 and D2 illustrated in FIG. 6 each indicate a direction or a position in the same plane in the Z direction.

The gaze direction identification unit 162 included in the HMD 100 detects the position of the pupil of the right eye RE from a photographed image obtained by photographing the right eye RE by the inner camera 68, and thereby calculates the line-of-sight direction of the right eye RE. In addition, the gaze direction identification unit 162 detects the position of the pupil of the left eye LE from a photographed image obtained by photographing the left eye LE by the inner camera 69, and thereby calculates the line-of-sight direction of the left eye LE. Line-of-sight directions calculated by the gaze direction identification unit 162 include the line-of-sight directions DR1, DR2, and DR3, and the line-of-sight directions DL1, DL2, and DL3 illustrated in FIG. 6.

The gaze direction identification unit 162 calculates the gaze direction of the user U based on the line-of-sight direction of the right eye RE and the line-of-sight direction of the left eye LE. Here, the gaze direction of the user U is a direction in which the user U gazes at by both eyes, and can be paraphrased as a direction toward the gaze point with the image display unit 20 as the starting point. More specifically, in the gaze direction identification unit 162, a line-of-sight reference position 29 is set to the center of the right eye RE and the left eye LE in the image display unit 20. The gaze direction identification unit 162 calculates the direction from the line-of-sight reference position 29 toward the gaze point as the gaze direction of the user U.

As a control example, the line-of-sight direction obtained when the right eye RE of the user U faces the front is illustrated as the line-of-sight direction DR1, while the line-of-sight direction obtained when the left eye LE faces the front is illustrated as the line-of-sight direction DL1. The line-of-sight directions DR1 and DL1 are a direction that travels straight in the Y direction with the right eye RE and the left eye LE as the starting point, respectively.

The gaze point P1 is a point positioned in front of the user U in the virtual screen VSC, and lies in the Y direction of the line-of-sight reference position 29. The lines of sight of the right eye RE and the left eye LE when the user U gazes at the gaze point P1 are referred to as the line-of-sight directions DR2 and DL2.

The gaze direction identification unit 162 uses the line-of-sight directions DR2 and DL2 as reference line-of-sight directions when the user U gazes in front. The line-of-sight directions DR2 and DL2 are different from the line-of-sight directions DR1 and DL1. However, since they are directions pointing toward the gaze point P1 positioned in front of the line-of-sight reference position 29, the line-of-sight directions DR2 and DL2 are appropriate as reference. The gaze direction identification unit 162 detects the line-of-sight directions DR2 and DL2, and associates the gaze direction D1 pointing toward the gaze point P1 with the line-of-sight reference position 29 as the starting point and the line-of-sight directions DR2 and DL2.

The gaze direction identification unit 162 may consider that the user U gazes forward when the right eye RE is pointing in a direction between the line-of-sight direction DR1 and the line-of-sight direction DR2, and the left eye LE is pointing in a direction between the line-of-sight direction DL1 and the line-of-sight direction DL2. In other words, the gaze direction in these cases may be considered as the gaze direction D1. Specifically, the angle formed by the line-of-sight direction DR2 with the line-of-sight direction DR1 is referred to as an angle θR, while the angle formed by the line-of-sight direction DL2 with the line-of-sight direction DL1 is referred to as an angle θL. At this time, when the line-of-sight direction of the right eye RE is within the range of the angle θR and the line-of-sight direction of the left eye LE is within the range of the angle θL, then the gaze direction of the user U is determined to be the gaze direction D1. In such a case, the user U is positioned in front of the line-of-sight reference position 29 just like the gaze point P1, and gazes farther than the gaze point P1, so it is appropriate to determine the gaze direction to be the gaze direction D1.

For example, when the user U gazes at the gaze point 22 in the figure, the gaze direction identification unit 162 calculates the line-of-sight direction DR3 of the right eye RE from a photographed image of the inner camera 68, and calculates the line-of-sight direction DL3 of the left eye LE from a photographed image of the inner camera 69. Based on the line-of-sight direction DR3 and the line-of-sight direction DL3, the gaze direction identification unit 162 determines the gaze direction D2 with the line-of-sight reference position 29 as the starting point. This processing is referred to below as identifying the gaze direction D2.

The gaze direction identification unit 162 may calculate the line-of-sight direction of the user U based on a plurality of photographed images photographed by the inner camera 68 and a plurality of photographed images of the inner camera 69, and by taking into account subtle movement of the right eye RE and the left eye LE. Human eyeballs are known to perform microscopic involuntary movements called fixational eye movements or saccades. Since photographed images of the inner camera 68 are affected by fixational eye movements of the right eye RE, the line-of-sight direction of the right eye RE determined from a photographed image of the inner camera 68 includes a blur caused by fixational eye movements. The gaze direction identification unit 162 may cause the inner camera 68 to perform photographing a plurality of times in every predetermined period of time, calculate the line-of-sight direction of the right eye RE from each of the plurality of photographed images obtained by such photographing, statistically process the calculated line-of-sight directions, and thereby determine the line-of-sight direction of the right eye RE. Similarly, the gaze direction identification unit 162 may cause the inner camera 69 to perform photographing a plurality of times in every predetermined period of time, calculate the line-of-sight direction of the left eye LE from each of the plurality of photographed images, and statistically process the calculated line-of-sight directions. In this case, the gaze direction identification unit 162 can reduce the effect of fixational eye movements of the right eye RE and the left eye LE and calculate a more accurate line-of-sight direction.

The line-of-sight directions DR1 and DL1 when the user U gazes at the gaze point P1 serve as reference in the processing of the gaze direction identification unit 162.

The HMD 100 sets the line-of-sight directions DR1 and DL1 by a function of the setting unit 164. The setting unit 164 may, for example, execute calibration to detect the line-of-sight directions DR1 and DL1.

Figure 7:
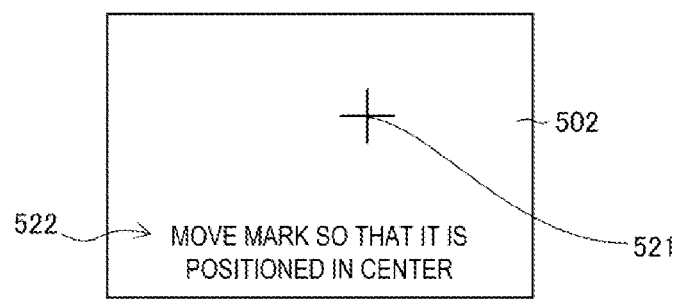
FIG. 7 is an explanatory view of an operation of a setting unit.

FIG. 7 is an explanatory view illustrating an example of an operation of the setting unit 164. FIG. 7 illustrates a setting screen 502 displayed by the image display unit 20.

The setting unit 164 causes the image display unit 20 to display the setting screen 502, and executes calibration. The setting screen 502 includes a mark 521 and a guide 522. The setting unit 164 moves the mark 521 in response to an operation on the operation unit 140 or an operation to the touch panel 350.

The guide 522 guides the user U to move the mark 521 to a position that the user U considers to be the center of the visual field. The user U operates the operation unit 140 or the touch panel 350 in accordance with the guide 522 to move the mark 521.

After the mark 521 is moved, the setting unit 164 determines the line-of-sight direction of the right eye RE and the line-of-sight direction of the left eye LE from photographed images of the inner cameras 68 and 69. The setting unit 164 sets the determined line-of-sight directions as the line-of-sight direction DR1 and the line-of-sight direction DL1 that correspond to the gaze direction D1. The setting unit 164 stores information indicating the line-of-sight direction DR1 and the line-of-sight direction DL1 that correspond to the gaze direction D1 in the memory 170 as line-of-sight reference data 172.

The setting unit 164 determines the center of visual field 291 based on the position of the mark 521 after movement. The setting unit 164 stores the positional relationship between the position of the center of visual field 291 and the display position of the image display unit 20 in the memory 170 as visual field setting data 173. Here, the setting unit 164 may determine the first range 293 and the second range 295 with the center of visual field 291 as a reference, generate data regarding the positions of the first range 293 and the second range 295, and include the data in the visual field setting data 173.

The center of visual field 291 is identified, for example, by the coordinates in the display region 290. That is, the center of visual field 291 may be one point in the visual field of the user U. In addition, the center of visual field 291 may be a figure such as a circle having a predetermined area. When the center of visual field 291 is a figure having an area, accuracy required of the user U in calibration may be low, so the burden on the user U can be reduced. In this case, the first range 293 and the second range 295 are set, for example, with the outer edge of the center of visual field 291 as a reference. In addition, a mark having an area such as a circle can be used for calibration instead of a cruciform mark 521 that can specify a point.

The setting unit 164 may acquire data regarding the line-of-sight direction DR1 and the line-of-sight direction DL1 by a method other than calibration. For example, the line-of-sight reference data 172 may be generated based on the line-of-sight directions of the right eye RE and the left eye LE at a predetermined period of time after the image display unit 20 is mounted. Specifically, the line-of-sight reference data 172 may be generated by considering the line-of-sight directions of the right eye RE and the left eye LE when variation in the posture of the user U and variation in the line-of-sight directions of the right eye RE and the left eye LE are small as the front direction of the user U. In addition, the line-of-sight reference data 172 may be generated by learning the correlation between the posture of the user U and the line-of-sight directions of the right eye RE and the left eye LE by artificial intelligence, and determining the line-of-sight directions of the right eye RE and the left eye LE when the user U faces the front. In this case, the setting unit 164 may use artificial intelligence included in the processor 160, or utilize learned artificial intelligence included in the control device 300 or other devices.

The setting unit 164 may be capable of setting the position of the line-of-sight reference position 29. In this case, for example, the setting unit 164 identifies the position of the right eye RE from a photographed image of the inner camera 68, and identifies the position of the left eye LE from a photographed image of the inner camera 69. The setting unit 164 may set the line-of-sight reference position 29 based on the positions of the right eye RE and the left eye LE. For example, the setting unit 164 sets the line-of-sight reference position 29 to a position overlapping the center between the right eye RE and the left eye LE in the front frame 27. In addition, the setting unit 164 may estimate or calculate the PD of the user U based on the position of the right eye RE and the position of the left eye LE, and determine the position of the line-of-sight reference position 29 based on the PD of the user U. PD is the distance between the pupils and is an abbreviation for pupillary distance.

Figure 8:
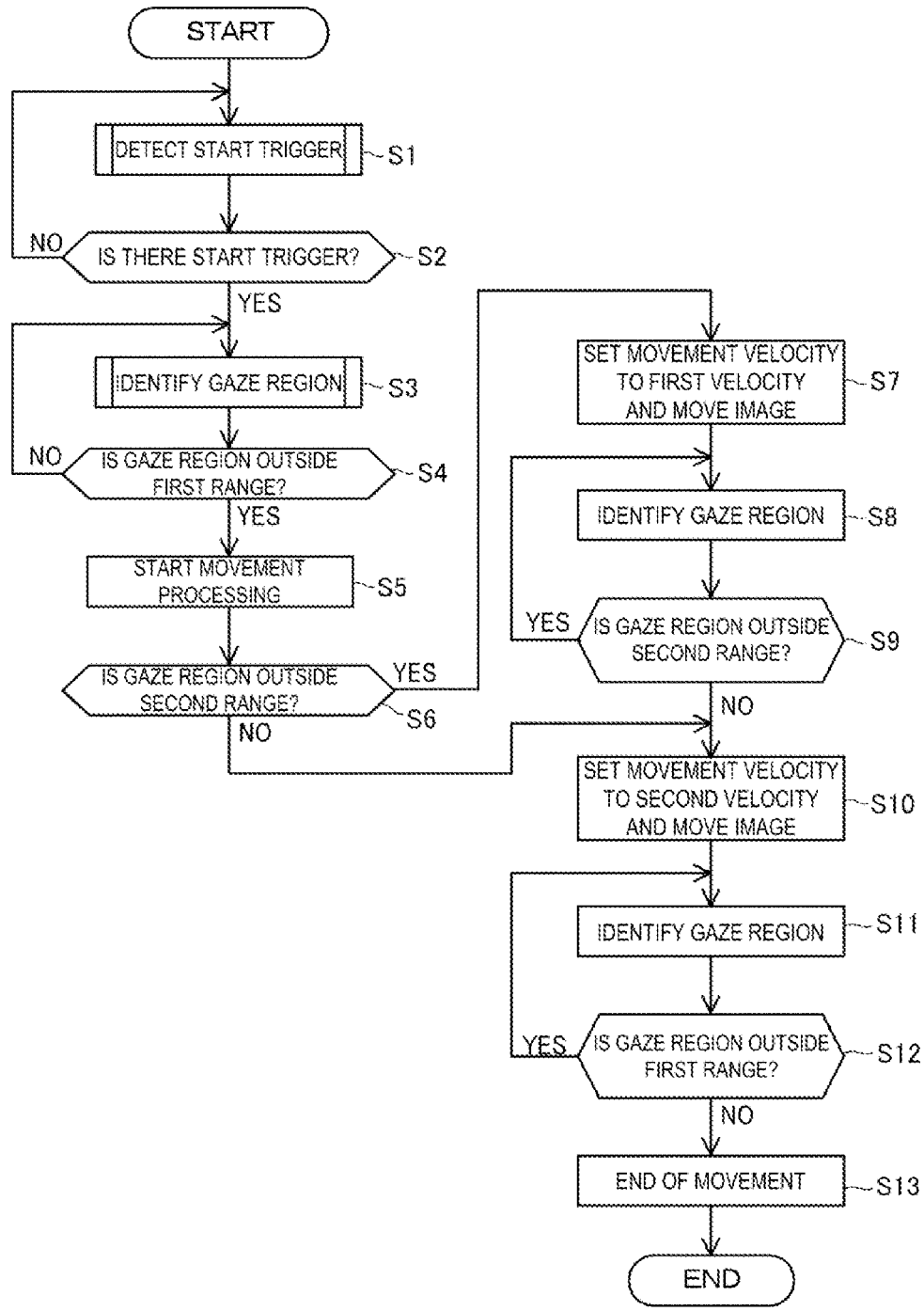
FIG. 8 is a flowchart illustrating an operation of an HMD.
Figure 9:
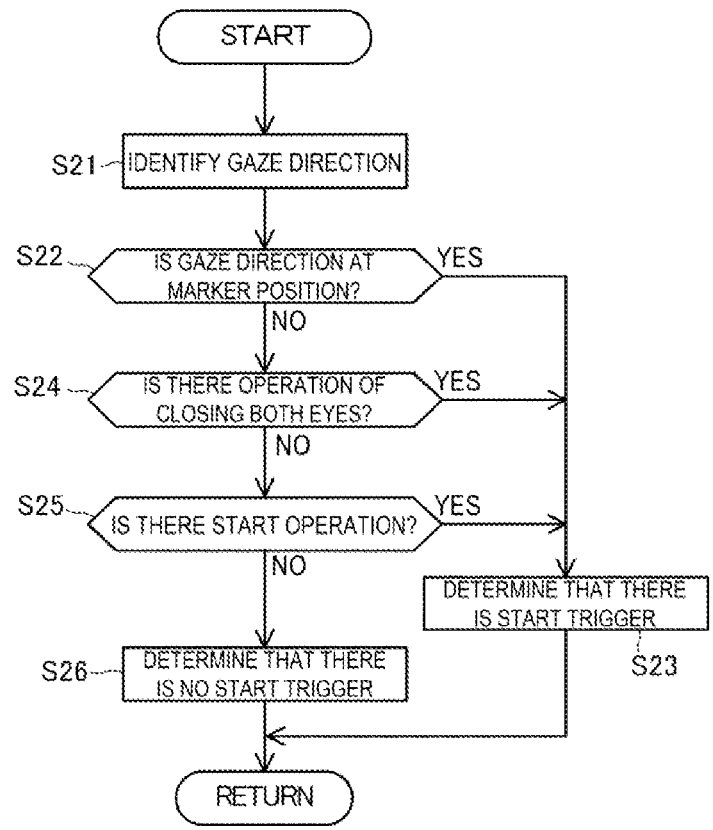
FIG. 9 is a flowchart illustrating an operation of an HMD.
Figure 10:
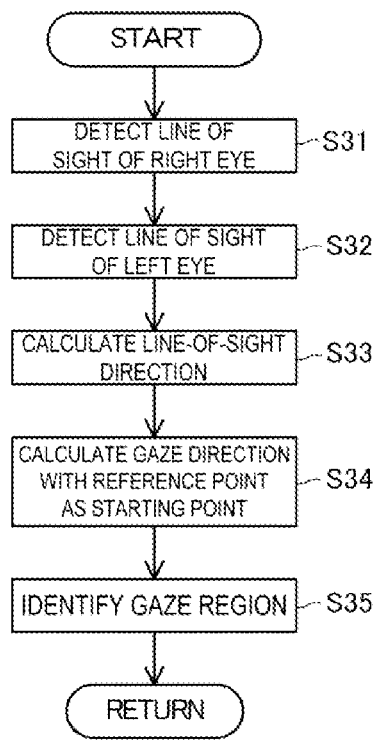
FIG. 10 is a flowchart illustrating an operation of an HMD.

FIGS. 8, 9, and 10 are flowcharts illustrating operations of the HMD 100. The operations illustrated in these figures are executed by the processor 160.

The HMD 100 performs processing for detecting a start trigger of the processing for changing the display aspect of the display image 501 (step S1). Here, the operation of step S1 is illustrated in detail in FIG. 9.

In the present embodiment, the specific operation detection unit 163 detects, as a start trigger, an operation of gazing at an operation marker by the user, an operation of closing both eyes by the user U, and a specific operation on the operation unit 140. The operation marker is a figure or an icon that the HMD 100 displays so as to be overlaid on the display image 501. As an instruction image allowing the user U to instruct a start or an end of the processing for changing the display aspect, the HMD 100 can arrange a marker in the display image 501 of the image display unit 20.

The HMD 100 identifies the gaze direction of the user U (step S21). In step S21, the HMD 100 calculates the line-of-sight directions of the right eye RE and the left eye LE of the user U from photographed images of the inner cameras 68 and 69, for example, and determines the gaze direction from the calculated line-of-sight directions.

The HMD 100 determines whether the gaze direction identified in step S21 is to a position overlapping the operation marker (step S22). When the gaze direction identified in step S21 is at the marker position (step S22; YES), the HMD 100 determines that there is a start trigger (step S23) and proceeds to step S2 in FIG. 8.

When the gaze direction identified in step S21 is not at the marker position (step S22; NO), the HMD 100 determines occurrence or non-occurrence of an operation of closing both eyes by the user U based on photographed images of the inner cameras 68 and 69 (step S24). When the user U performs an operation of closing both eyes (step S24; YES), the HMD 100 proceeds to step S23.

When it is determined that the user U performs no operation of closing both eyes (step S24; NO), the HMD 100 determines whether an operation of instructing a start of the processing for changing the display aspect is performed by the operation unit 140 (step S25). When an applicable operation is performed (step S25; YES), the HMD 100 proceeds to step S23. When no applicable operation is performed (step S25; NO), the HMD 100 determines that there is no start trigger (step S26) and proceeds to step S2 in FIG. 8.

The HMD 100 refers to the determination result of step S1 (step S2). When it is determined that there is no start trigger (step S2; NO), the HMD 100 returns to step S1. When it is determined that there is a start trigger (step S2; YES), the HMD 100 identifies the gaze region 512 that the user U gazes at (step S3).

The operation of step S3 is illustrated in detail in FIG. 10.

The HMD 100 extracts an image of the right eye RE from a photographed image of the inner camera 68, and detects the line of sight of the right eye RE (step S31). In addition, the HMD 100 extracts an image of the left eye LE from a photographed image of the inner camera 69, and detects the line of sight of the left eye LE (step S32). The HMD 100 calculates, from the lines of sight detected in steps S31 and S32, the line-of-sight direction of the right eye RE and the line-of-sight direction of the left eye LE, respectively (step S33). Based on the line-of-sight direction of the right eye RE and the line-of-sight direction of the left eye LE, the HMD 100 calculates a gaze direction with the line-of-sight reference position 29 as the starting point (step S34). The HMD 100 identifies the gaze region 512 corresponding to the gaze direction of the user U in the display image 501 of the image display unit 20 (step S35). At step S35, the HMD 100 may calculate the coordinates of the gaze position 511 that the user U gazes at in the display image 501 based on the gaze direction, and determine the gaze region 512 centered on the gaze point. In addition, the HMD 100 may directly calculate the gaze region 512 based on the gaze direction and the distance between the image display unit 20 and the virtual screen VSC. After the processing in FIG. 3, the operation of the HMD 100 proceeds to step S4 in FIG. 8.

The HMD 100 determines whether the gaze region 512 is outside the first range 293 (step S4). Here, when the gaze region 512 is not outside the first range 293 (step S4; NO), there is no need to move the display image 501, so the HMD 100 maintains the display of the display image 501 and returns to step S3.

When the gaze region 512 is outside the first range 293 (step S4; YES), the HMD 100 starts the processing for moving the gaze region 512 toward the center of visual field 291 (step S5). When starting the movement, the HMD 100 determines whether the gaze region 512 is outside the second range 295 (step S6). When the gaze region 512 is outside the second range 295 (step S6; YES), the HMD 100 sets the movement velocity of the display image 501 to the first velocity and starts the movement of the display image 501 (step S7).

The HMD 100 is capable of setting the velocity at which the display image 501 is moved to at least two stages. In the present embodiment, the HMD 100 is capable of setting the movement velocity of the display image 501 to the first velocity and the second velocity, with the first velocity being faster than the second velocity. In addition, the HMD 100 can change the movement velocity of the display image 501.

The HMD 100 performs the processing for identifying the gaze region 512 (step S8). The operations of step S8 and step S11 to be described later are, for example, operations similar to those of step S3.

The HMD 100 determines whether the position of the gaze region 512 identified in step S8 is outside the second range 295 (step S9). When the gaze region 512 is outside the second range 295 (step S9; YES), the HMD 100 returns to step S8. When the gaze region 512 reaches inside the second range 295 by the processing for moving the display image 501, the HMD 100 makes a negative determination in step S9. The HMD 100 repeatedly executes the operation of step S8 at predetermined time intervals until a negative determination is made in step S9.

When the HMD 100 determines that the position of the gaze region 512 is not outside the second range 295 (step S9; NO), and when the HMD 100 determines in step S6 that the gaze region 512 is not outside the second range 295 (step S6; NO), the HMD 100 proceeds to step S10. In step S10, the HMD 100 sets the movement velocity of the display image 501 to the second velocity and moves the display image 501 (step S10).

The HMD 100 identifies the gaze region 512 (step S11), and determines whether the position of the gaze region 512 is outside the first range 293 (step S12). When the gaze region 512 is outside the first range 293 (step S12; YES), the HMD 100 returns to step S11. When the gaze region 512 reaches inside the first range 293 by the processing for moving the display image 501, the HMD 100 makes a negative determination in step S12. The HMD 100 repeatedly executes the operation of step S11 at predetermined time intervals until a negative determination is made in step S12.

When the HMD 100 determines that the position of the gaze region 512 is not outside the first range 293 (step S12; NO), the HMD 100 ends the movement of the display image 501 (step S13).

The operation of FIG. 8 illustrates an example of operation in which the HMD 100 is capable of setting the movement velocity of the display image 501 in two stages. However, the HMD 100 may be capable of setting the movement velocity of the display image 501 to three or more finer stages.

The HMD 100 may perform the processing for identifying the gaze region 512 even after the operation of FIG. 8 ends. In other words, after step S13, the HMD 100 may return to step S3.

In addition, during the operation of FIG. 8 and after the operation of FIG. 8, the HMD 100 may end the movement of the display image 501 upon a specific operation that serves as a trigger. In other words, when either an operation of closing both eyes by the user U or a specific operation on the operation unit 140 is detected, the specific operation detection unit 163 determines that there is an end trigger, and ends the movement of the display image 501. Here, when it is determined that there is an end trigger during an operation of moving the display image 501 by the HMD 100, the movement of the display image 501 may be stopped by interrupt processing. In addition, when it is determined that there is an end trigger, the HMD 100 may return to a state prior to executing the operation of FIG. 8.

In addition, operations based on which the specific operation detection unit 163 determines that there is an end trigger may include the user U gazing at a marker overlaid on the display image 501. In this case, there is an advantage that the user U can instruct an end of the processing for changing the display aspect without turning the line of sight away from the display image 501.

The setting unit 164 may perform calibration for the display position of an operation marker displayed by the HMD 100. For example, the setting unit 164 causes the image display unit 20 to display operation markers to allow the user U to gaze at each marker. The setting unit 164 detects the line-of-sight directions of the right eye RE and the left eye LE when a marker is gazed at, for example, by using photographed images of the inner cameras 68 and 69. This allows the gaze state of a marker to be more accurately detected according to personal differences in the line-of-sight direction obtained when the user U gazes at a marker.

In the present embodiment, an example is described in which the entire display image 501 is moved in order to move the gaze region 512. However, the gaze region 512 may be cut out from the display image 501 to move the gaze region 512 toward the center of visual field 291. In addition, in the present embodiment, an operation of moving the display image 501 is illustrated until the gaze region 512 enters the first range 293. However, the movement may be continued until the gaze region 512 reaches the center of visual field 291.

6. Advantageous Effects of Embodiments

As described above, in the display system 1 according to an embodiment to which the present disclosure is applied, the HMD 100 mounted on the user U's head includes the image display unit 20 and the gaze direction identification unit 162 that identifies a direction in which the user U gazes. The HMD 100 includes the display control unit 161 that adjusts the display aspect of the display image so that the gaze region that the user U gazes at in the display image displayed in the image display unit 20 approaches the center of visual field 291, which is a predetermined position corresponding to the front of the user U.

According to the HMD 100, the region that the user U gazes at approaches a position that is easy to see in the visual field of the user U, so the burden on the user U can be reduced and convenience can be improved.

The present disclosure provides a display method for displaying an image by the HMD 100. The display method includes an identifying step for identifying a direction in which the user U gazes. The display method includes an adjusting step for adjusting a display aspect of a display image so that a gaze region that the user U gazes at in the display image displayed by the HMD 100 approaches a predetermined position corresponding to a front of the user.

The present disclosure provides a non-transitory computer-readable storage medium including a computer executable program configured to display an image by the HMD 100 mounted on the user U's head. The program is a program for identifying a direction in which the user U gazes, and adjusting a display aspect of a display image so that a gaze region that the user U gazes at in the display image displayed by the HMD 100 approaches a predetermined position corresponding to a front of the user U.

According to the above-described display method and program, the region that the user U gazes at is brought close to a position that is easy to see in the visual field of the user U, so the burden on the user U can be reduced and convenience can be improved.

In a display method according to the present disclosure, the predetermined position is preset; and in the adjustment step, at least a part of the display image is moved so that the gaze region is positioned within a predetermined range from a predetermined position. This allows the region that the user U gazes at in the display image to be easily moved to a position that is easy to see for the user U.

A display method according to the present disclosure includes a setting step for setting a predetermined position based on a line-of-sight direction obtained when the user U faces the front. This allows a predetermined position appropriate for the user U to be set.

In a display method according to the present disclosure, in the process of moving the display image in the adjustment step, the velocity of movement of the display image is changed. This allows the display image to be quickly moved, and uncomfortable feeling of the user U that accompanies the movement of the display image to be reduced.

In a display method according to the present disclosure, in the adjustment step, in a stage where the gaze region is positioned outside a target range centered on a predetermined position, the display image is moved at a first velocity, and in a stage where the gaze region is positioned within the target range, the display image is moved at a second velocity slower than the first velocity. This allows the movement velocity of the display image to be changed in response to the relative position between the gaze region and the predetermined position. Therefore, the display image can be quickly moved, and uncomfortable feeling of the user U that accompanies the movement of the display image can be reduced.

In a display method according to the present disclosure, in the identifying step, a line-of-sight direction of the user U is detected by a line-of-sight detection unit included in the HMD 100, and the direction in which the user U gazes is identified based on a detection result of the line-of-sight detection unit. This allows the direction in which the user U gazes to be quickly identified.

A display method according to the present disclosure includes a detecting step for detecting a specific operation performed by the user U, and when the specific operation is detected, at least one of processing for starting the identifying step and processing for ending the adjusting step is executed. This allows the user U to easily instruct a start or an end of the processing for changing the display aspect of the display image.

In a display method according to the present disclosure, a display image in which a marker is arranged is displayed by the image display unit 20; and in the detecting step, the user U gazing at the marker is detected as a specific operation. This allows the user U to easily instruct a start or an end of processing without the user U turning the line of sight away from the display image of the image display unit 20.

7. Other Embodiments

The present disclosure is not limited to the configurations described in the embodiments described above. The present disclosure can be carried out in various aspects without departing from the gist of the disclosure.

The image display unit 20 is not limited to a form in which the image display unit 20 is directly mounted on the user U's head. For example, the image display unit 20 may have a form to be mounted like a hat, for example. In addition, for example, the image display unit 20 may have a form in which the right display unit 22 and the left display unit 24 are separated. In addition, the image display unit 20 may have a form in which only one of the right display unit 22 and the left display unit 24 is included. In addition, the image display unit 20 may be configured as a display built into a body protector tool such as a helmet.

The HMD 100 is an example of a display device to which the present disclosure is applicable, and is not limited to the configuration illustrated in FIG. 2. For example, a configuration in which the image display unit 20 and the coupling device 10 are separated is described as an example in the above-described embodiments. However, a configuration in which the coupling device 10 and the image display unit 20 are integrally formed and mounted on the user U's head may also be used. In addition, the optical system of the image display unit 20 may be configured as desired. For example, an optical member positioned in front of an eye of the user U and overlapping a part or all of the field of view of the user U may be used. Alternatively, a scanning type optical system may be adopted in which scanning by laser light and the like is used as imaging light. Alternatively, the optical system is not limited to those in which imaging light is guided within an optical member, and may be those that only have a function of refracting and/or reflecting imaging light toward an eye of the user U.

In addition, a configuration may be adopted in which at least some of the function blocks illustrated in FIG. 2 and FIG. 3 are realized by hardware, or may be realized by cooperation between hardware and software. The present disclosure is not limited to a configuration in which independent hardware resources are arranged as illustrated in the figures. In addition, a configuration may be adopted in which a program executed by the processor 160 is a program stored in an external device and acquired by the HMD 100 via a communication line for execution.

What is claimed is:

1. A display method for displaying an image on a display device mounted on a head of a user, the display method comprising:

an identifying step for identifying a gaze region of the image in which the user gazes; and an adjusting step for adjusting a position of the gaze region displayed on the display device to approach a predetermined position corresponding to a front of the user, wherein in the adjusting step, at least a part of the gaze region is moved to a predetermined range centered on the predetermined position, when the position of the gaze region is outside the predetermined range, the gaze region of the image is moved at a first velocity, and when the position of the gaze region is within the predetermined range, the gaze region of the image is moved at a second velocity slower than the first velocity.

2. The display method according to claim 1, further comprising a setting step for setting the predetermined position based on a line-of-sight direction when the user faces the front.

3. The display method according to claim 1, wherein in the identifying step, detecting a line-of-sight direction of the user, and identifying the gaze region of the image based on the detected line-of-sight direction.

4. The display method according to claim 1, further comprising a detecting step for detecting a specific operation performed by the user, wherein in the detecting step, when the specific operation is detected, either processing for starting the identifying step or processing for ending the adjusting step is executed.

5. The display method according to claim 4, wherein the image includes a marker image, and the specific operation in which the user gazes at the marker image.

6. A display device mounted on a head of a user, the display device comprising:

a display that displays an image; and a processor configured to:

identify a gaze region of the image in which the user gazes;

adjust a position of the gaze region displayed on the display to approach a predetermined position corresponding to a front of the user;

move at least a part of the gaze region to a predetermined range centered on the predetermined position;

move the gaze region at a first velocity when the position of the gaze region is outside the predetermined range; and move the gaze region at a second velocity slower than the first velocity when the position of the gaze region is within the predetermined range.

7. The display device according to claim 6, wherein the processor is further configured to set the predetermined position based on a line-of-sight direction when the user faces the front.

8. The display device according to claim 6, wherein the processor detects a line-of-sight direction of the user, and the processor identifies the gaze region of the image based on the detected line-of-sight direction.

9. A non-transitory computer-readable storage medium comprising a computer executable program configured to display an image on a display device mounted on a head of a user, the computer executable program being configured to:

identify a gaze region of the image in which the user gazes;

adjust a position of the gaze region displayed on the display device to approach a predetermined position corresponding to a front of the user;

move at least a part of the gaze region to a predetermined range centered on the predetermined position;

move the gaze region at a first velocity when the position of the gaze region is outside the predetermined range; and move the gaze region at a second velocity slower than the first velocity when the position of the gaze region is within the predetermined range.

* * * * *